(12) United States Patent  
Ragle et al.

(10) Patent No.: US 6,195,018 B1
(45) Date of Patent: Feb. 27, 2001

(54) METERING SYSTEM

(75) Inventors: Steven J. Ragle, Hayward; Robert A. Hayes, Palo Alto; Christopher S. King, Berkeley; Larsh M. Johnson, San Francisco, all of CA (US)

(73) Assignee: CellNet Data Systems, Inc., San Carlos, CA (US)

( * ) Notice: Subject to any disclaimer, the term of this patent is extended or adjusted under 35 U.S.C. 154(b) by 0 days.

(21) Appl. No.: 08/597,724

(22) Filed: Feb. 7, 1996

(51) Int. Cl.[7] ................................................ G08C 19/16
(52) U.S. Cl. ........................ 340/870.01; 340/870.02; 340/870.03; 340/870.11
(58) Field of Search ..................... 340/870.03, 870.02, 340/870.07, 870.11, 870.01

(56) References Cited

U.S. PATENT DOCUMENTS

| 3,705,385 | 12/1972 | Batz ................................. 340/152 R |
| 3,820,073 | 6/1974 | Vercellotti et al. . |
| 4,283,772 | 8/1981 | Johnston . |
| 4,315,248 | 2/1982 | Ward . |
| 4,350,980 | * 9/1982 | Ward ............................. 340/870.02 |
| 4,415,853 | * 11/1983 | Fisher ................................. 324/73 |
| 4,465,970 | 8/1984 | DiMassimo et al. . |
| 4,517,669 | 5/1985 | Freeburg et al. ..................... 370/82 |
| 4,589,075 | 5/1986 | Buennagel ......................... 364/492 |
| 4,597,105 | 6/1986 | Freeburg ............................ 455/33 |
| 4,638,314 | 1/1987 | Keller . |
| 4,697,182 | 9/1987 | Swanson . |
| 4,698,628 | 10/1987 | Herkert .......................... 340/825.02 |
| 4,749,992 | 6/1988 | Fitzemeyer et al. . |
| 4,799,059 | 1/1989 | Grindahl et al. ................. 340/870.03 |
| 4,804,957 | * 2/1989 | Selph et al. ..................... 340/870.03 |
| 5,038,140 | 8/1991 | Ikeuchi .......................... 340/825.02 |
| 5,056,107 | 10/1991 | Johnson et al. . |
| 5,079,715 | * 1/1992 | Venkataraman et al. ....... 340/870.02 |
| 5,216,357 | * 6/1993 | Coppola et al. ..................... 324/142 |
| 5,506,404 | 4/1996 | Milan-Kamski . |
| 5,553,094 | * 9/1996 | Johnson et al. ................. 340/870.02 |
| 5,590,179 | * 12/1996 | Shincovich et al. ............ 340/870.03 |
| 5,696,501 | * 12/1997 | Ouellette et al. ............... 340/870.03 |

OTHER PUBLICATIONS

Domestic Automation Company, "SuperMeter II family of intelligent registers" SM–3300, Product Profile, San Carlos, California.

Domestic Automation Company, "LINC Data Acquisition System", Product Profile, San Carlos, California.

Domestic Automation Company, "SM–101", Product Profile, San Carlos, California.

Domestic Automation Company, "SM–301", Product Profile, San Carlos, California.

Domestic Automation Company, "DAC Probe" Product Profile, San Carlos, California.

Domestic Automation Company, "Super Meter" Product Profile, San Carlos, California.

(List continued on next page.)

Primary Examiner—Brian Zimmerman
Assistant Examiner—Timothy Edwards, Jr.
(74) Attorney, Agent, or Firm—Fish & Richardson P.C.

(57) ABSTRACT

A metering system provides a measuring level with multiple meters and a collection level with multiple collectors. Each meter periodically measures a parameter, such as electricity consumption, and stores measurement information. Each meter periodically transmits its stored measurement information to a collector by a wireless signal. When a collector receives a transmission, it determines which meter sent the transmission, and then extracts unprocessed measurement information. The collector then processes the measurement information to generate a metered function, such as a load profile, a time-of-use profile, or a demand profile. The collector can compensate for missed transmissions and power failures. The metered functions for each meter are transmitted from the collectors to a monitoring station.

39 Claims, 11 Drawing Sheets

OTHER PUBLICATIONS

Larry Waters, General Electric Company, "Future trends in metering" Southeastern Meterman's Association Conference on meters., Tampa, Florida, Oct., 1991.

GE Meter and Control, "GE UCNet System", publication, Somersworth, NH, Sep., 1991.

Ed White, "Development of the MV–90 Multi–Vendor Translation System", Releigh, North Carolina, 1990.

GE Electronic Metering, "TMR–900", Product Profile, Somersworth, NH, Jan. 1990.

General Electric, "Engineering Presentation to AEIC/EEI Meter and Service Committees", Indianapolis, Indiana, Sep. 22, 1986.

General Electric, "Engineering Presentation to Pennsylvania Electric Association Meter Committee", Reading, Pennsylvania, Oct. 15–16, 1987.

General Electric, "Engineering Presentation to AIEC/EEI Meter and Service Committees", Colombus, Ohio, Apr. 27, 1987.

General Electric, "DR–87 Electronic Demand Recorder", Product Profile, Somersworth, NH.

* cited by examiner

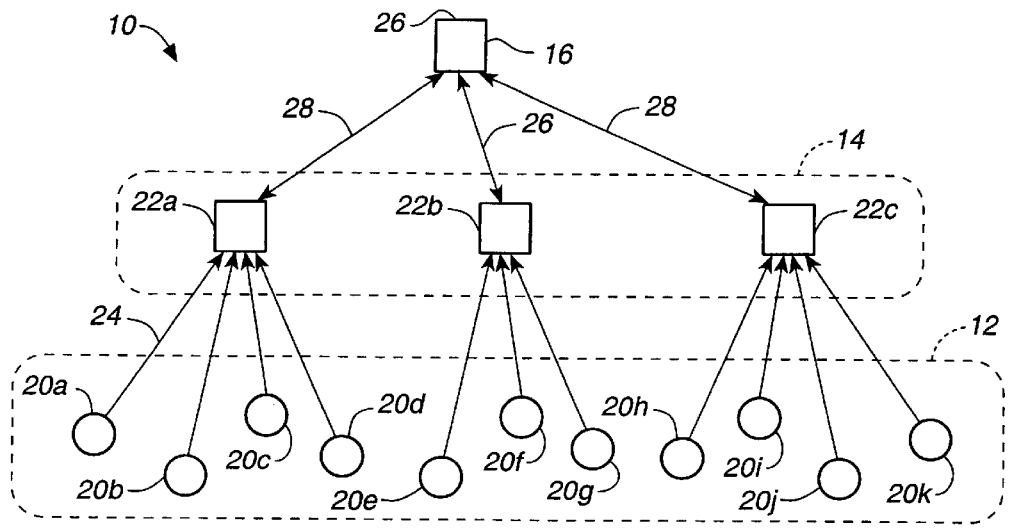
FIG._1
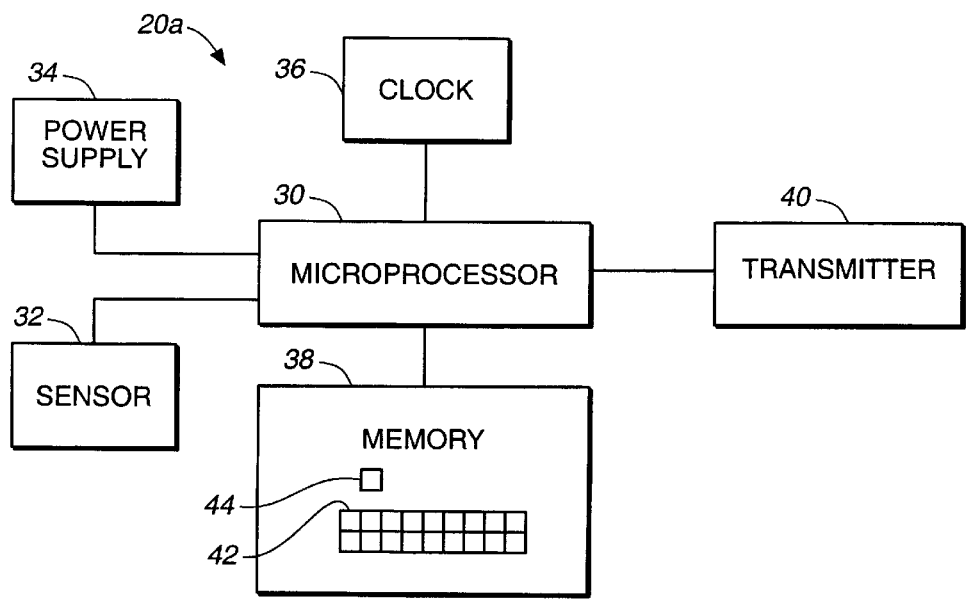
FIG._2

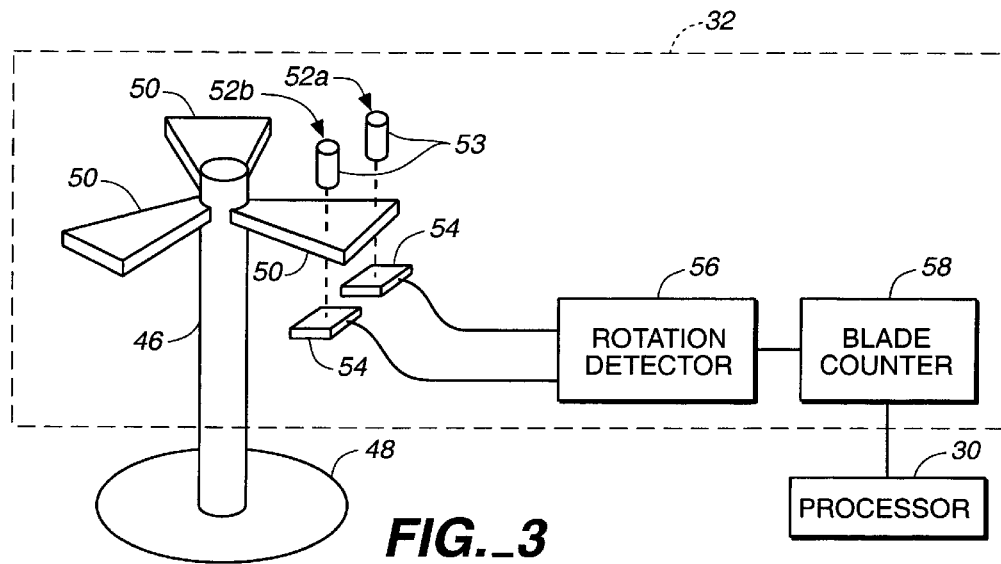
FIG._3
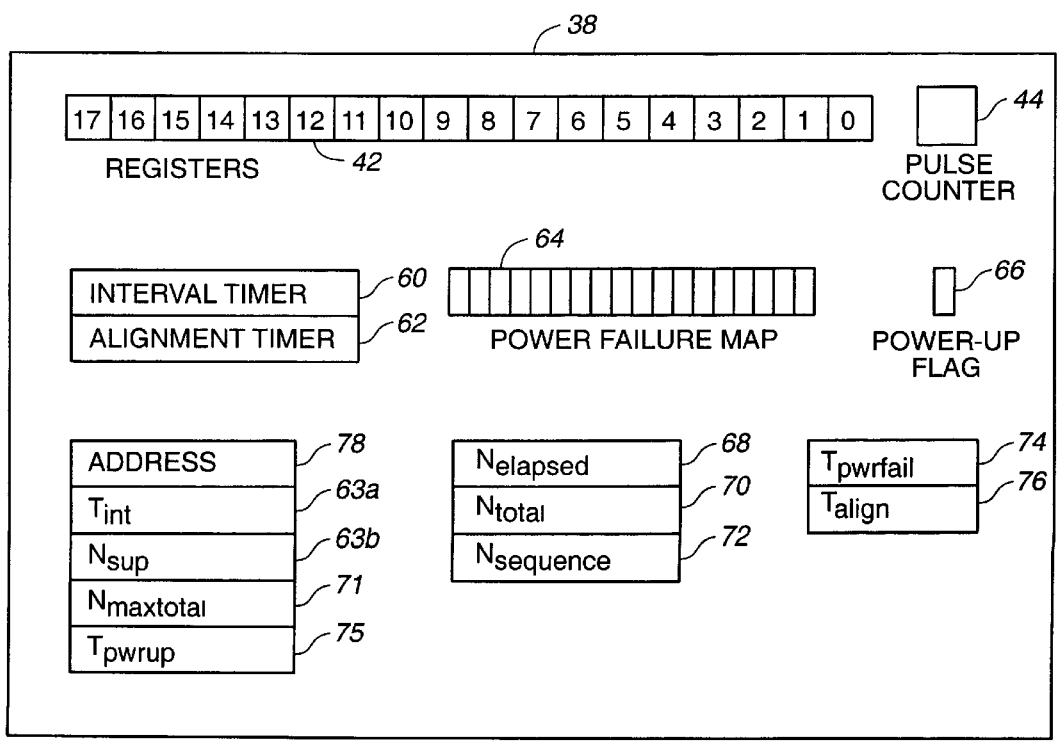
FIG._4

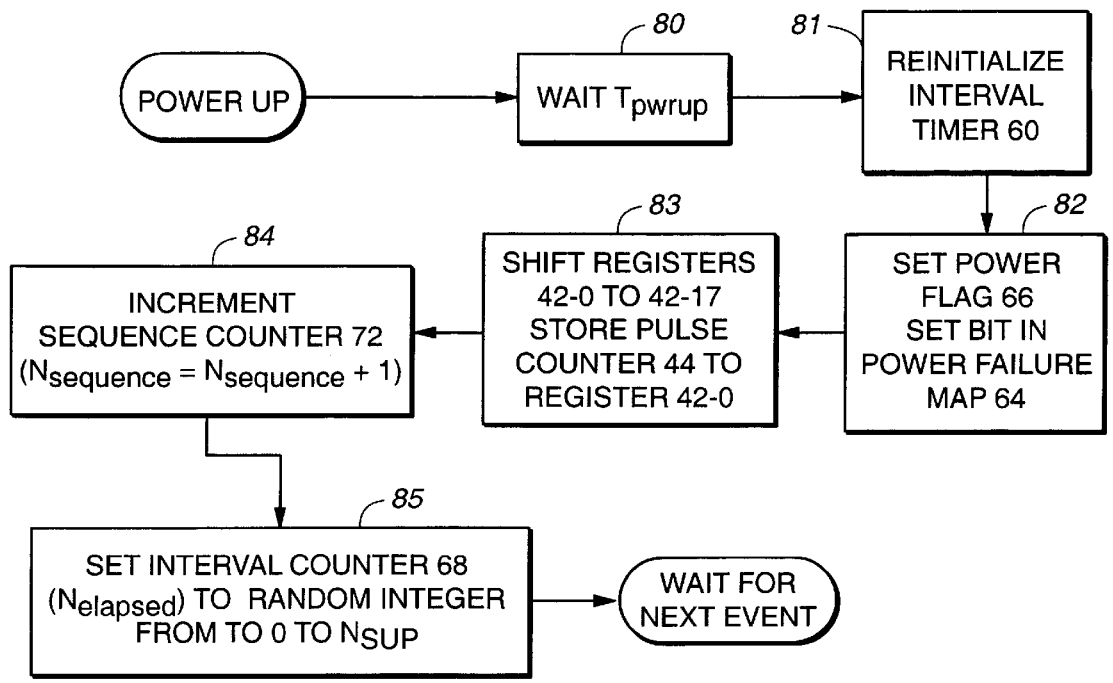
FIG._5A
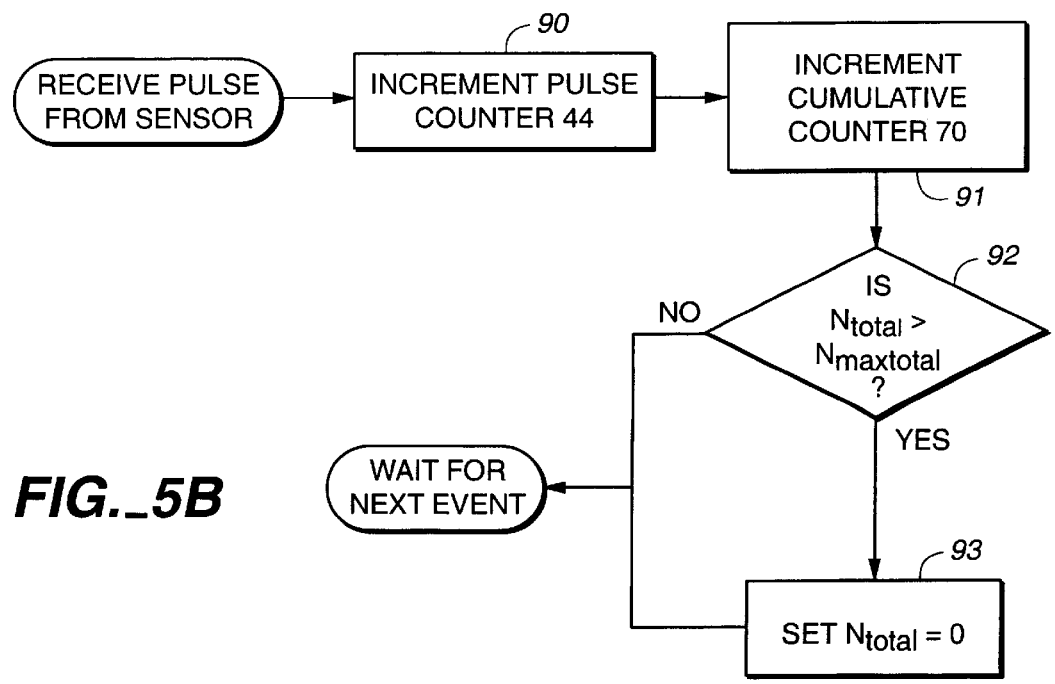
FIG._5B

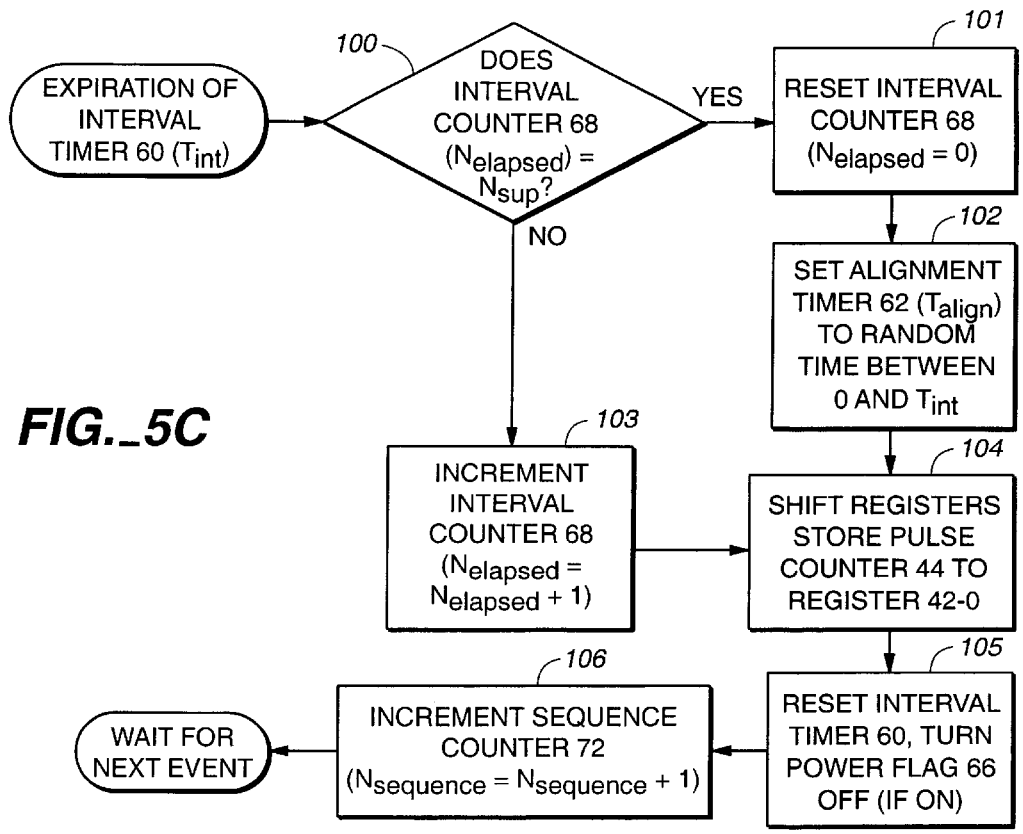
FIG._5C
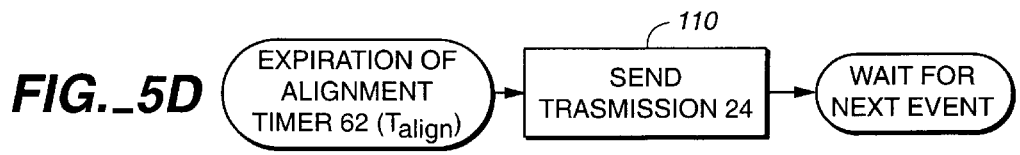
FIG._5D
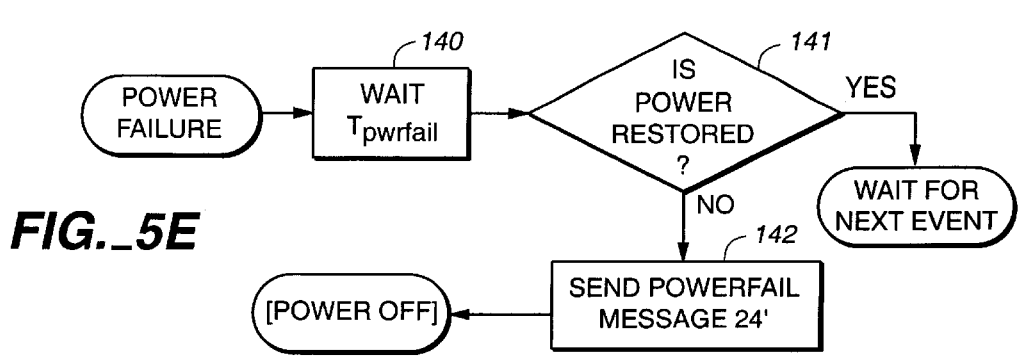
FIG._5E

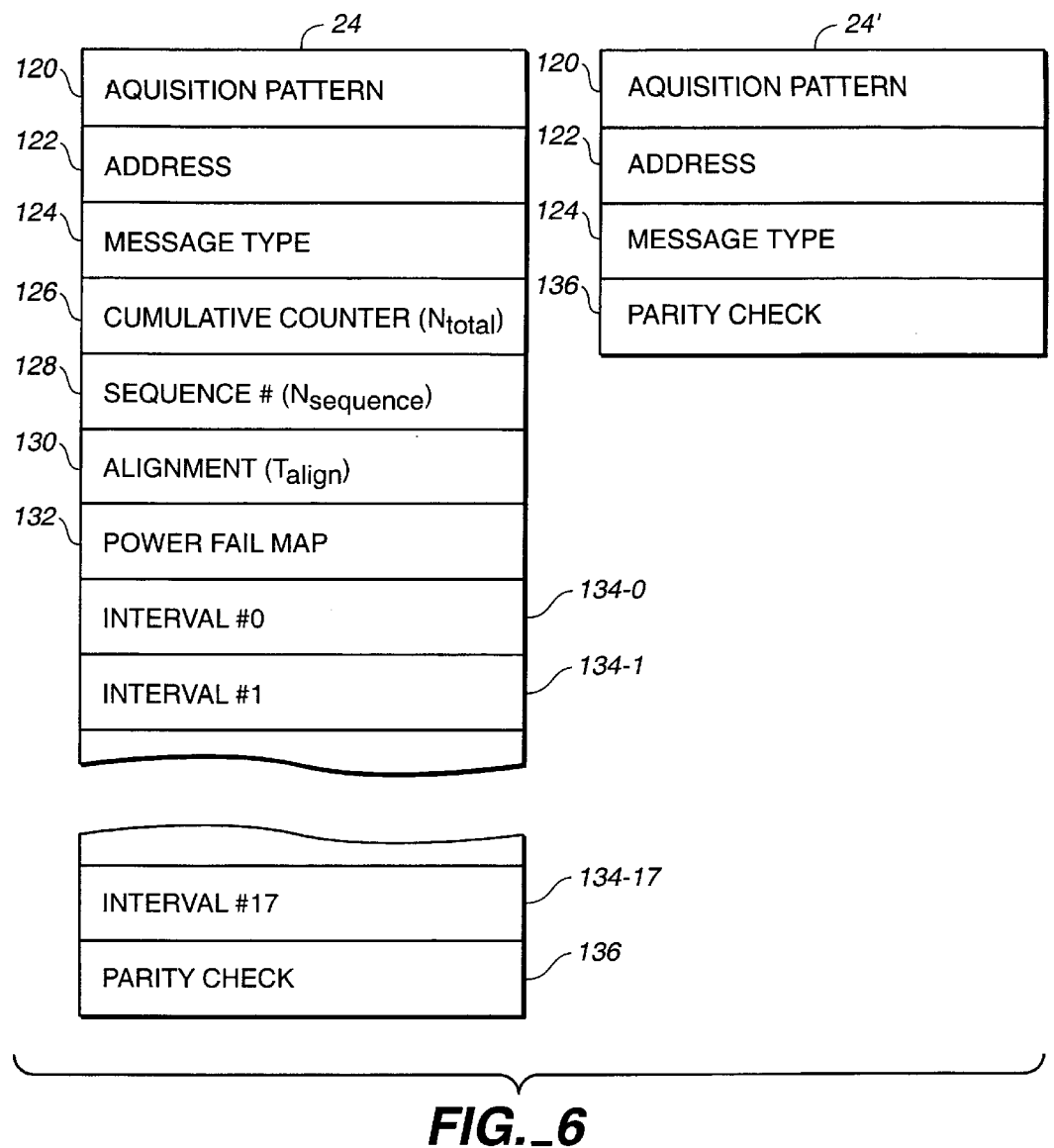
FIG._6

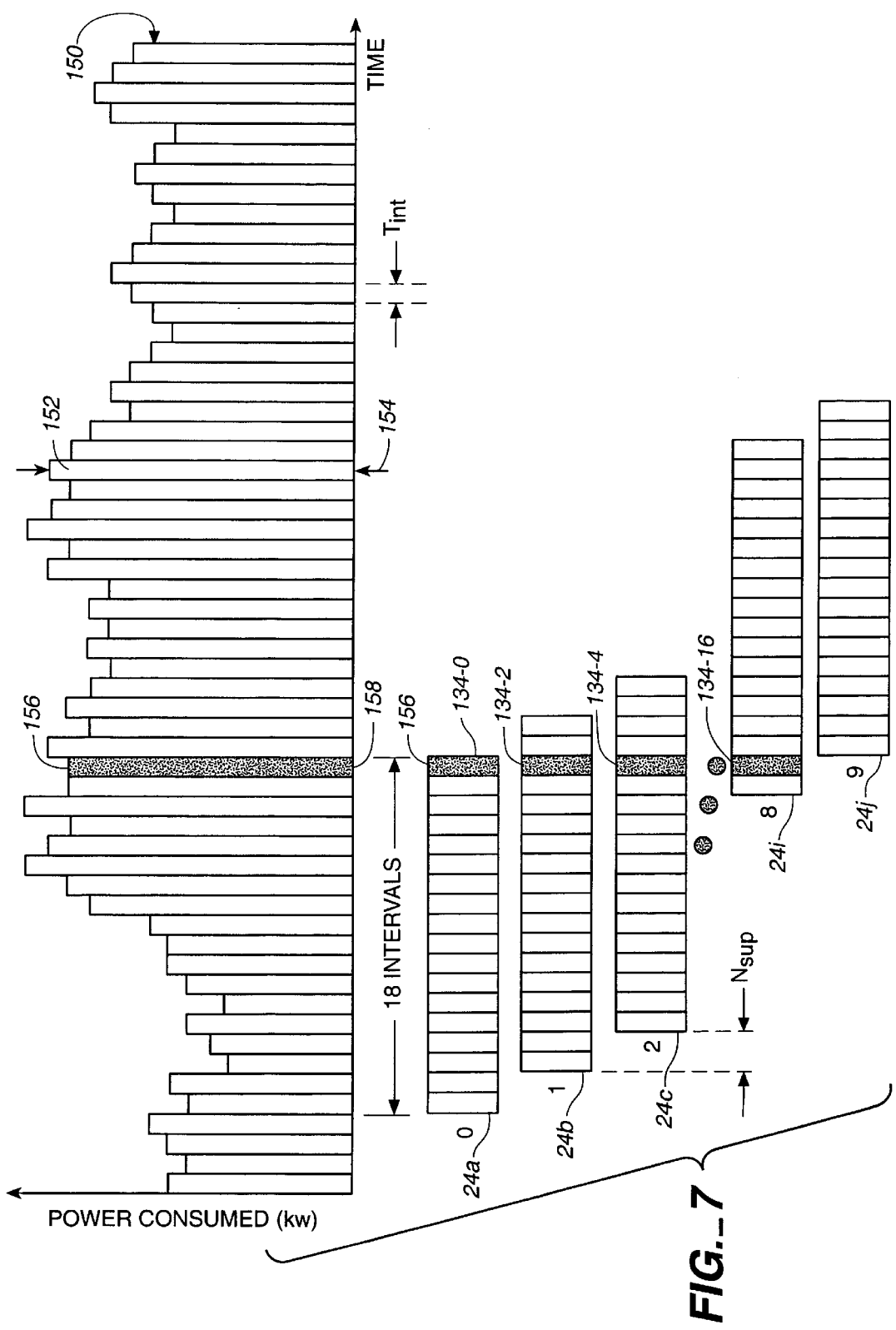
FIG._7

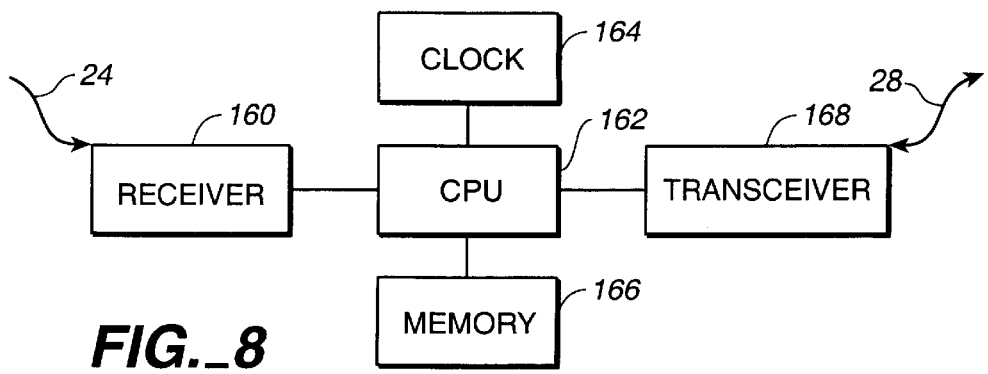
FIG._8
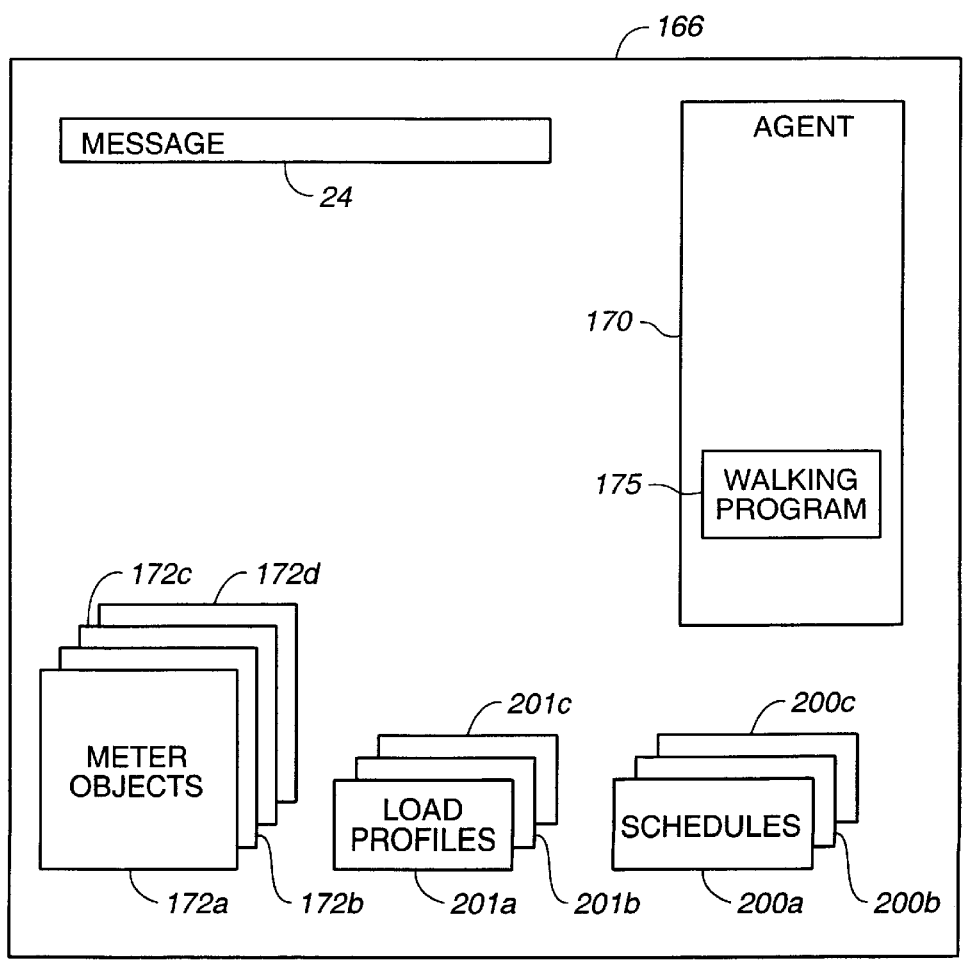
FIG._9

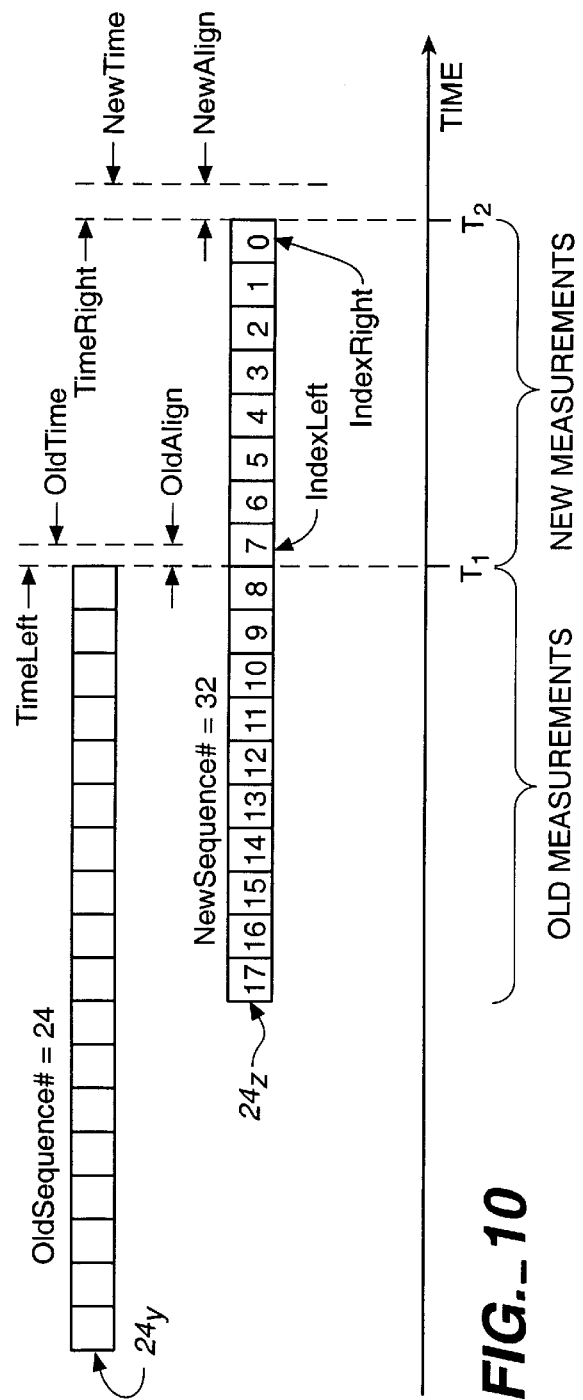
FIG._10
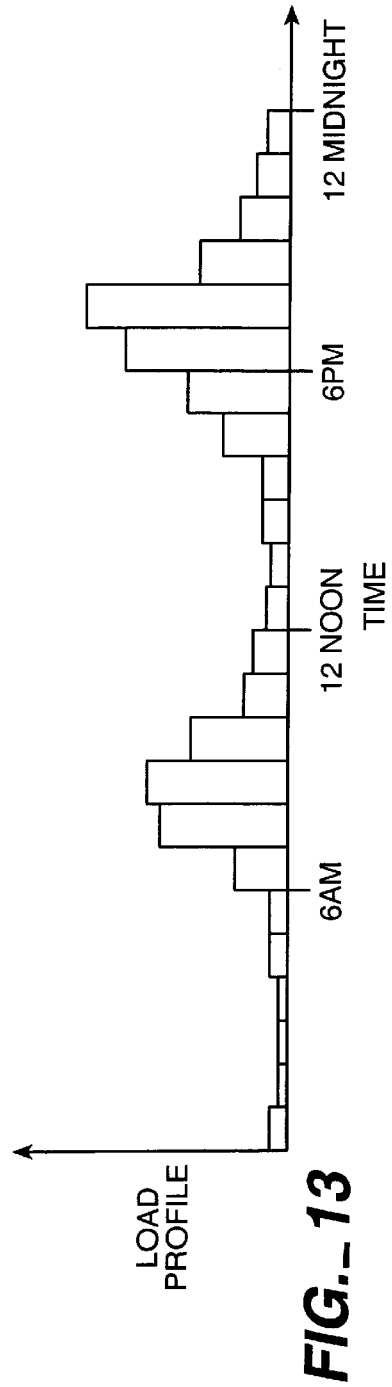
FIG._13

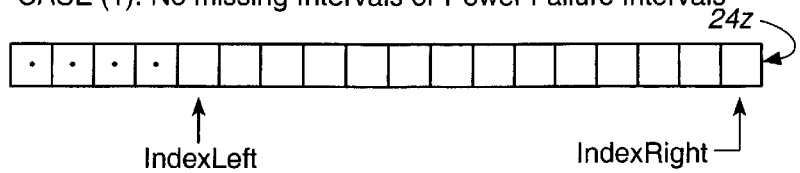
CASE (1): No missing Intervals or Power Failure Intervals
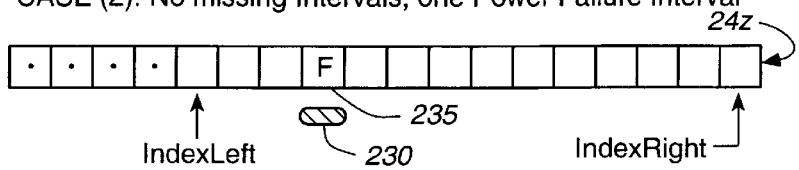
CASE (2): No missing Intervals, one Power Failure Interval
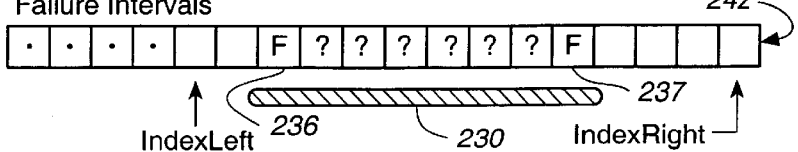
CASE (3): No missing Intervals, two or more Power Failure Intervals
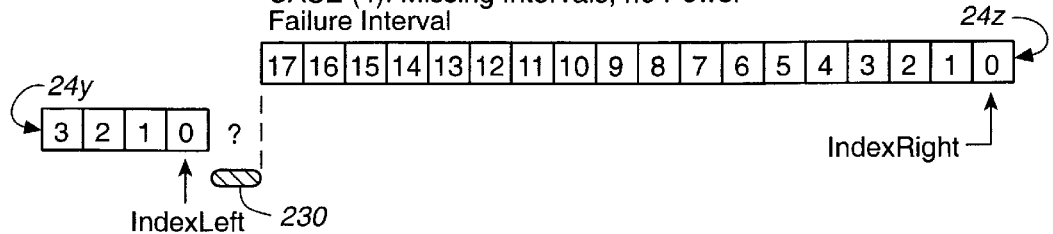
CASE (4): Missing Intervals, no Power Failure Interval
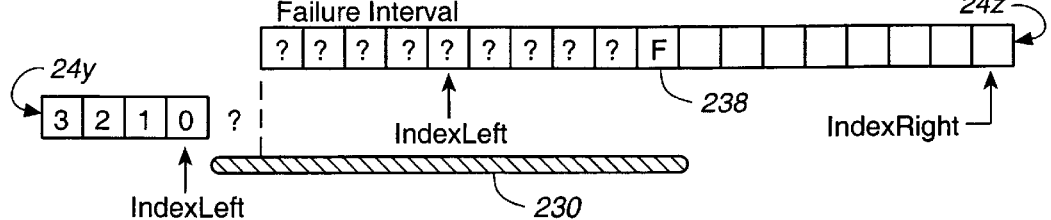
CASE (5): Missing Intervals, one or more Power Failure Interval
⟅⟆ recovery period    O old interval    F Power Failure
FIG._11

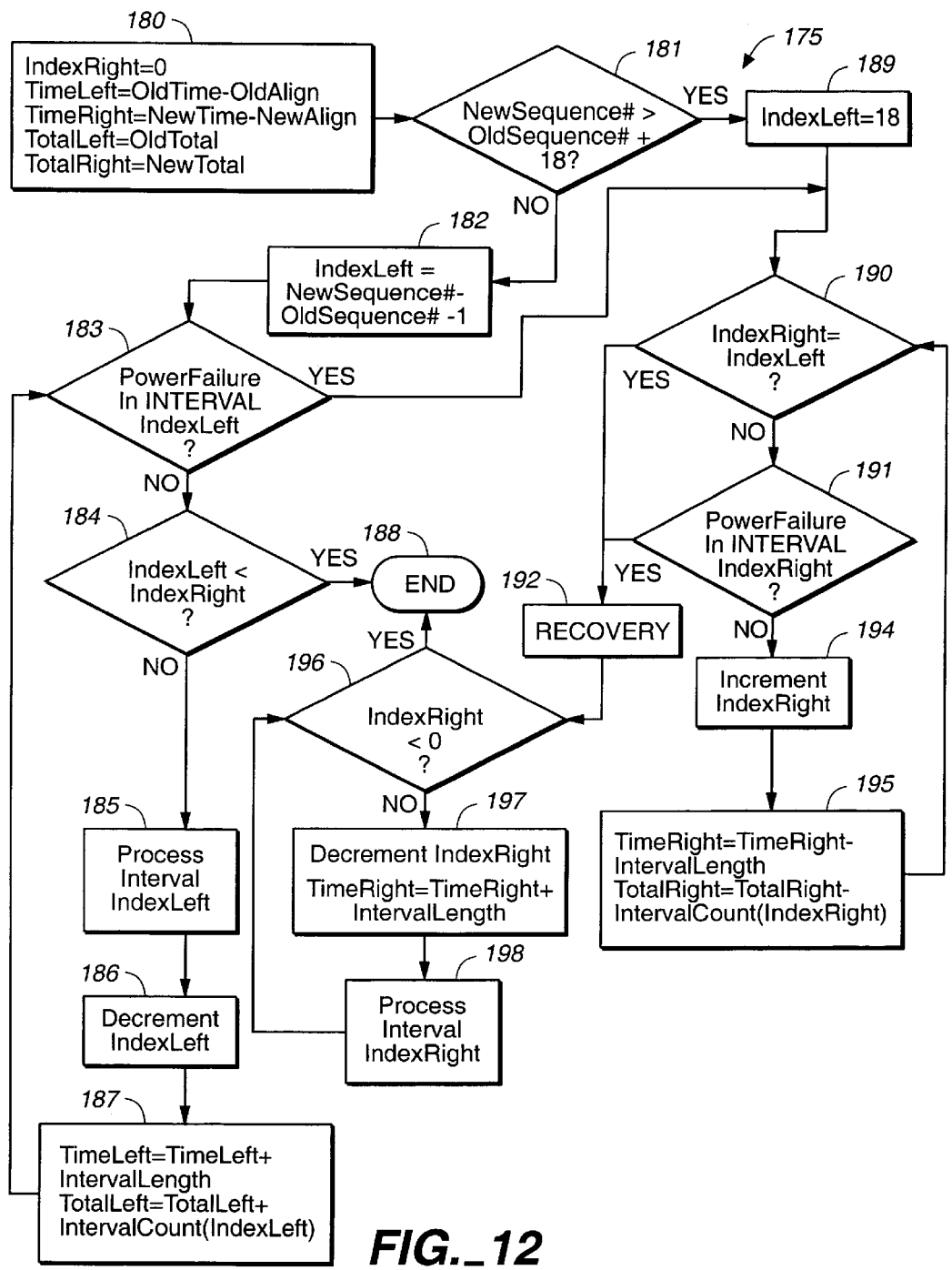
FIG._12

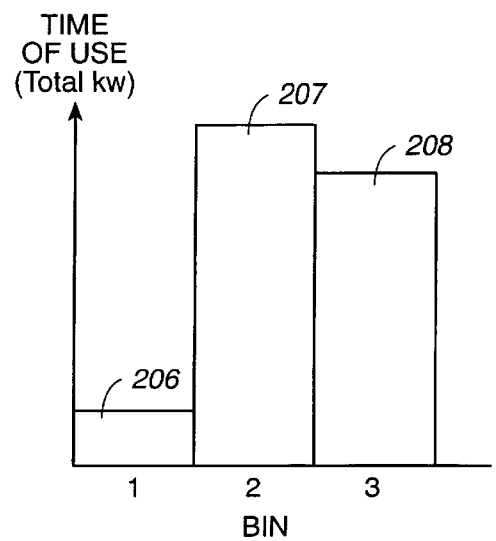
| TIME | BIN |
|---|---|
| WEEKENDS | 1 |
| WEEKDAYS: 7AM - 10AM | 2 |
| WEEKDAYS: 11AM - 5PM | 3 |
| WEEKDAYS: 5PM - 8PM | 2 |
| WEEKDAYS: 8PM - 7AM | 3 |
FIG._14A
FIG._14B
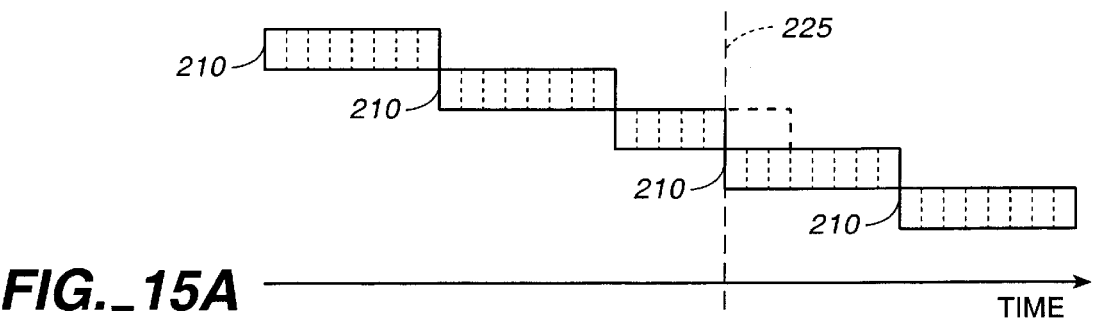
FIG._15A
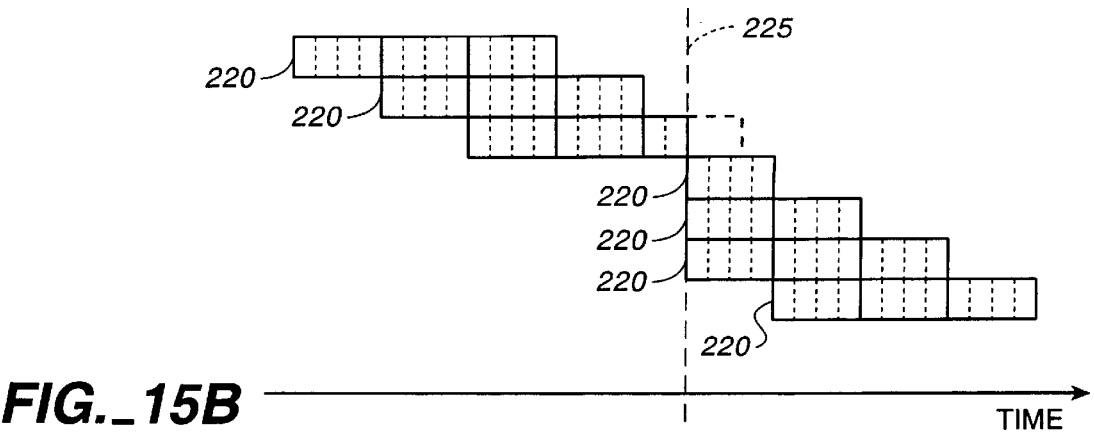
FIG._15B

METERING SYSTEM

BACKGROUND OF THE INVENTION

The present invention relates to metering systems, and, in particular, to distributed metering systems using wireless communication.

Metering is the periodic measurement of a parameter at multiple locations. For example, utility companies meter the natural gas, electricity and water consumed by households.

The collection of data from a metering system is usually performed by physical inspection of individual meters. For example, in residential areas, electrical utility companies use electromechanical meters with rotating disks to measure the consumption of electricity. Electrical utility companies send a "meter reader" to record the meter measurement about once a month. Metering of natural gas and water is handled similarly.

Utility companies often wish to charge different rates at different times. For example, an electrical utility company may wish to charge higher rates during peak hours of consumption, e.g., the morning and evening. In addition, electrical utility companies may wish to apply a penalty if a consumer exceeds a certain limit within a particular period of time. Unfortunately, electromechanical meters do not permit this objective to be achieved because they show only the cumulative consumption of electricity at the time of inspection.

The general ability to provide information about the history of a parameter at the time of inspection, e.g., something other than a cumulative total, will be referred to as profiled metering. Two basic approaches have been used to provide profiled metering.

One approach involves recording the meter measurements on paper, magnetic tape or computer memory for subsequent collection by physical inspection. The other approach is to use more complex meters that include a microprocessor, a clock and a memory. The microprocessor is preprogrammed with a particular billing schedule to increment a selected register depending on an internal clock. Again, the contents of the registers are collected by physical inspection. Unfortunately, these complex meters are expensive and unreliable. In particular, after a power failure, the clock will differ from real time and an incorrect register may be incremented.

Another problem with electromechanical meters is that meter measurements need to be gathered by physical inspection by "meter readers". The physical inspection of meters by is expensive. An automated system to electronically transmit metering information could provide considerable cost savings. However, a residential community may have tens or hundreds of thousands of meters. Even with computers, the simultaneous monitoring of tens of thousands of meters by a central computer system is difficult.

SUMMARY OF THE INVENTION

In general, in one aspect, the invention provides a metering system having multiple telemetry devices and multiple collection devices. There are fewer collection devices than telemetry devices. The telemetry devices include a sensor to measure a parameter to generate measurements, a memory configured to store the measurements, and a transmitter to transmit the stored measurements to a collection device at transmission times. Each measurement is transmitted at a plurality of different transmission times. The collection devices includes a receiver to receive transmissions from the telemetry devices, a processor for extracting the measurements from the transmissions and analyzing the measurements to generate a metered function of the parameter, and a transmitter to transmit the metered function to a monitoring station.

The sensor of the metering system may include a counter to store a value, a means for incrementing the counter upon receipt of a trigger signal, and a means for storing the value from the pulse counter in the telemetry device memory and resetting the pulse counter at each measurement time. The telemetry device memory may store eighteen measurements, and may discard old measurements and store new measurements. The telemetry device may include a measurement timer for a set interval, such as 2.5 minutes, to trigger a measurement time at its expiration. A power failure may trigger a measurement. The telemetry device may store and increment a sequence counter, and detect power failures. The collection device memory may be configured to store a plurality of objects, each representing a telemetry device. Each collection device may include a means for determining and storing a time of receipt for each transmission. The metering function may be a load profile, a time-of-use profile or a demand profile. The parameter may be electrical power, fluid flow, voltage, current, temperature, pressure, or humidity.

In general, in another aspect, the invention provides a method of metering. A parameter is measured with a telemetry device to generate measurements and a plurality of measurements are stored in the telemetry device. The measurements are transmitted to a collection device at a transmission times. The measurements are extracted from the transmissions, and are analyzed to generate a metered function of the parameter. The metered function is transmitted to a monitoring station.

The advantages of the invention include the following. The metering system can provide profiled metering without physical inspection of the individual meters and uses wireless communication to transmit information. In addition, the metering system is cost-effective, reliable, resistant to power failures, and adaptable to a variety of applications.

Additional objects and advantages of the invention will be set forth in the description which follows, and in part will be obvious from the description, or may be learned by practice of the invention. The objects and advantages of the invention may be realized by means of the instrumentalities and combinations particularly pointed out in the claims.

BRIEF DESCRIPTION OF THE DRAWING

The accompanying drawings, which are incorporated in and constitute a part of the specification, schematically illustrate a preferred embodiment of the invention, and together with the general description given above and the detailed description of the preferred embodiment given below, serve to explain the principles of the invention.

FIG. 1 is a schematic diagram of a metering system according to the present invention.

FIG. 2 is a schematic diagram of a meter of FIG. 1.

FIG. 3 is a schematic illustration of a sensor used in the meter of FIG. 2.

FIG. 4 is a schematic illustration of the contents of the memory of the meter of FIG. 2.

FIG. 5A is a flowchart showing the steps performed by the meter of FIG. 2 upon powering up.

FIG. 5B is a flowchart showing the steps performed by the meter of FIG. 2 upon receipt of a pulse from a sensor.

FIG. 5C is a flowchart showing the steps performed by the meter of FIG. 2 at the expiration of an interval timer.

FIG. 5D is a flowchart showing the steps performed by the meter of FIG. 2 at the expiration of an alignment timer.

FIG. 5E is a flowchart showing the steps performed by the meter of FIG. 2 upon detection of a power failure.

FIG. 6 is a schematic diagram showing the format of transmissions sent from a meter to a collector in the metering system of FIG. 1.

FIG. 7 is a schematic graph of a series of measurements and transmissions by a meter of the present invention.

FIG. 8 is a schematic diagram of a collector in the metering system of FIG. 1.

FIG. 9 is a schematic illustration of the contents of the memory of the collector of FIG. 8.

FIG. 10 is a schematic illustration of the relationship between two successive transmissions by a meter.

FIG. 11 is a schematic illustration of five possible combinations of missing intervals and power failures in two successive transmissions by a meter.

FIG. 12 is a flowchart showing the step performed by the collector of FIG. 8 to extract a series of measurements from a sequence of transmissions by a meter.

FIG. 13 schematically illustrates a load profile metering function.

FIG. 14A is a schematic illustration of a schedule for a time-of-use function.

FIG. 14B is a schematic illustration of bins for a time-of-use function.

FIG. 15A schematically illustrates a block demand profile function.

FIG. 15B schematically illustrates a rolling demand profile function.

DESCRIPTION OF THE PREFERRED EMBODIMENT(S)

A metering or data collection system according to the present invention may be used in a variety of applications, such as utility metering, manufacturing control, traffic monitoring, and meteorological data gathering. As shown in FIG. 1, a metering system or network 10 has at least three functional levels: a measurement level 12, a collection level 14, and a monitoring level 16. The measurement level 12 periodically measures a parameter at multiple locations. Possible parameters include electricity usage (kilowatt-hours), natural gas flow (cubic feet), water flow (cubic feet), temperature (° C.), pressure (Torr), humidity (partial pressure), wind speed (miles per hour), precipitation (inches), voltage (volts), and current (amperes). The collection level 14 analyzes the periodic measurements to generate a metered function of the parameter at each location. The metered function information could be the minimum, maximum or average value of the parameter over a certain time period. The monitoring level 16 controls the collection level 14 and receives the metered function information. The operator of metering system 10 determines how monitoring level 16 uses the metered function information.

Measurement level 12 includes meters or telemetry devices 20a–20k to measure the parameter of interest and transmit the measurement to collection level 14. Although FIG. 1 shows only eleven meters, measurement level 12 could include thousands or even hundreds of thousands of meters. The meters are located as required for a particular application. For example, an electrical utility company could place one meter at each house in a residential neighborhood to measure electrical energy consumption. As described below, each meter may be constructed similarly.

Collection level 14 includes collectors 22a–22c. The collectors are located to receive transmissions from the meters. Each collector analyzes the periodic measurements by one or more meters to generate a metered function. For example, an electrical utility company could configure the collectors to determine the electricity consumed each hour over the last twenty-four hours, the total amount of electricity consumed between 6 p.m. and 8 p.m. over the last month, and the time of peak electricity consumption in the previous day, at each house in a residential neighborhood.

Monitoring level 16 should include a monitoring station 26, e.g., a computer, to receive, store, and manipulate the metered functions. The functions of monitoring level 16 depend upon the intended application for metering system 10. For example, an electrical utility company could use monitoring level 16 to generate a billing for each house in a residential neighborhood at the end of each month.

Each meter 20a–20k in metering level 12 periodically sends its measurements to collection level 14 by means of transmissions 24. These transmissions 24 may be any sort of wireless signals, such as radio frequency, microwave, or infrared signals. Each collector receives transmissions from one or more meters. For example, collector 22a may receive transmissions from meters 20a–20d. A collector may receive transmissions from fifty to one thousand meters, more preferably two hundred to five hundred meters. Each collector and its associated meters form a "cell". Meters 20a–20k may be "transmit only" devices; i.e., the meters are not able to receive transmissions from collectors 22a–22c. Each meter 20a–20k may have only enough processing power to perform measurements and transmit the measurements to collection level 14.

Although FIG. 1 shows only three collectors, collection level 14 could include hundreds or thousands of collectors, depending upon the number of meters in metering level 12. Collectors 22a–22c communicate with monitoring station 26 in monitoring level 16 by two-way wired or wireless transmissions 28. Preferably, for wireless communication, some or all of the collectors are elevated, e.g., placed on a telephone pole, to facilitate the reception of transmissions from meters 20a–20k and monitoring station 26.

Relative to measurement level 12, collection level 14 is "intelligent". As will be explained below, collection devices 22a–22c have sufficient processing power to extract useful information, e.g., profiled metering information, from the measurements. The concentration of intelligence in collection level 14 permits the use of inexpensive meters 20a–20k in measurement level 12.

Referring to FIG. 2, each meter, e.g., meter 20a, includes a microprocessor 30, a parameter sensor 32, a power supply 34, a clock 36, a memory 38, and a transmitter 40. Transmitter 40 is preferably a spread spectrum transmitter. Memory 38 includes several registers 42 and a pulse counter 44. Registers 42 and counter 44 store measurements from sensor 32. Referring to FIG. 4, in one embodiment of meter 20a, memory 38 has eighteen registers 42-0 through 42-17. Memory 38 is constructed of non-volatile memory devices, such as erasable programmable read-only-memory chips (EPROMS), so that stored measurements are not lost if power supply 34 fails.

Meter 20a measures the parameter at a series of measurement times. In normal operation a set time interval $T_{int}$, such as 2.5 minutes, separates each measurement time. Meter 20a can be configured either as a pulse accumulator meter or as a sampling meter. In the pulse accumulator mode, sensor 32 is triggered by a change in the parameter. Each time that sensor 32 is triggered, the sensor sends a pulse to processor 30. In response to the pulse, processor 30 increments counter 44. At the expiration of time interval $T_{int}$, as measured by clock 36, the content of counter 44 is stored in a register and the counter is cleared. In the sampling mode, sensor 32 does not automatically send signals to processor 30 when the parameter changes. Instead, sensor 32 continuously monitors the parameter, and processor 30 periodically, e.g., at the expiration of time interval $T_{int}$, samples the sensor to receive a measurement. Processor 30 stores the measurement in counter 44.

Whether configured as a pulse accumulator meter or a sampling meter, the measurements by sensor 32 are stored in memory 38. At the expiration of time interval $T_{int}$, processor 30 discards the oldest measurement stored by register set 42 and places the newest measurement from counter 44 into the empty register. In one embodiment, processor 30 shifts the contents the registers to move the contents of register 42-0 into register 42-1, the contents of register 42-1 into register 42-2, and so on (this discards the previous contents of register 42-17). Then the processor places the contents of counter 44 into register 42-0, and clears the pulse counter. Naturally, other embodiments, such as the use of a pointer or look-up chart to the stored measurements, are possible.

Meter 20a transmits its stored measurements to collection level 14 at a series of transmission times. Memory 38 stores a transmission frequency $N_{sup}$ which represents the number of measurement times per transmission. Processor 30 triggers a transmission time after $N_{sup}$ measurements. At the transmission time, processor 30 causes transmitter 40 to transmit the contents of registers 42-0 through 42-17 to collector 22a.

In one embodiment, a pulse-accumulator meter is retrofit to an existing electromechanical meter used by most electrical utility companies. Electromechanical meters use the flow of electricity to rotate a metal disk. The disk turns dials on the meter register to show the total consumption of electricity.

Referring to FIG. 3, in an electromechanical meter, a shaft 46 projects from the center of a rotating meter disk 48. To retrofit the electromechanical meter, one or more interrupter blades 50 are attached to shaft 46 to project radially from shaft 46 and rotate with disk 48. Three blades are used in a preferred configuration.

In one configuration, sensor 32 includes optical sensors and a rotation detector which sends a pulse to processor 30 each time the disk makes a complete rotation. Right and left optical sensors 52a and 52b each include an LED 53 above the plane of the interrupter blades, and a photodiode 54 below the plane of the interrupter blades. When an interrupter blade moves between the LED and the photodiode, no light from the LED can reach the photodiode, and the sensor detects the presence of the blade.

Sensor 32 may include a rotation detector 56 to detect the forward rotation of the interrupter blades. By comparing the order in which the optical sensors are activated, the rotational direction of the blade can be determined. For example, if first right sensor 52a, and then left sensor 52b detect the presence of a blade, the blade is rotating clockwise. Sensor 32 may also include a blade counter 58 which is incremented each time a forward rotation of the blade is detected. When the count by blade counter 58 equals the number of blades attached to the shaft, a full rotation of disk 48 has occurred.

Sensor 32 then sends a pulse to processor 30 to increment counter 44 and resets blade counter 58. The circuitry of rotation detector 56 and blade counter 58 may be combined with processor 30 and memory 38.

The configuration of meter 20a as a pulse accumulator meter or as a sampling meter will depend on the intended application of metering system 10. Similarly, many sorts of sensors could be used with the present invention, depending on the application of metering system 10. For example, in a traffic monitoring system, a pulse accumulator meter could be used to count the number of automobiles that travel over a particular road. Such a pulse accumulator meter could use a pneumatic line as the sensor. As another example, in a weather monitoring system, a sampling meter could be used to periodically sample the atmospheric temperature. Such a sampling meter could use a thermocouple as the sensor.

As shown in FIG. 4, in both the pulse accumulator mode and the sampling mode, memory 38 of meter 20a includes an interval timer 60, an alignment timer 62, and various constants and variables used by processor 30. Interval timer 60 is driven by clock 36 to count down the time between each measurement time, i.e., time interval $T_{int}$. Similarly, alignment timer 62 is driven by clock 36 to count down a delay time between a measurement time and a transmission time. The timers, constants and variables are used by processor 30 to accumulate periodic measurements from sensor 32 and transmit those measurements to collector 22a, as will be explained below with reference to FIGS. 5A–5E.

Memory 38 stores the time interval 63a, $T_{int}$, as a constant, i.e., a value which is not changed by the normal measurement and transmission operations of the meter. As discussed above, time interval $T_{int}$ represents the duration of time between each measurement time. Another constant stored in memory 38 is the transmission frequency 63b, $N_{sup}$, which represents the number of measurement times per transmission. By providing more registers in register set 42 than transmission frequency $N_{sup}$, each measurement is transmitted at multiple transmission times.

Memory 38 stores an elapsed interval counter 68, $N_{elapsed}$, as a variable, i.e., a value which is changed by the normal measurement and transmission operations of the meter. Elapsed interval counter $N_{elapsed}$ represents the number of measurement times since the last transmission. Elapsed interval counter 68 is incremented at each measurement time, and when $N_{elapsed}$ equals $N_{sup}$, a transmission time is triggered, and $N_{elapsed}$ is reset to zero.

Another variable stored in memory 38 is an alignment time variable 76, $T_{align}$, which represents a delay between the measurement time and the actual transmission time. Alignment time variable 76 is set randomly to a value less than time interval $T_{int}$. When a transmission time is triggered, alignment timer 62 counts down the alignment time $T_{align}$ between the measurement time and the transmission time.

Memory 38 is configured to track power failures in meter 20a. A variable stored by memory 38 is a power failure map 64, which indicates the intervals in which a power failure was detected. Power failure map 64 has the same number of bits, e.g., eighteen, as there are registers in register set 42. Each bit 64-0 to 64-17 represents whether a power failure occurred in the interval represented by the corresponding register. Anther variable stored in memory 38 is a power-up flag 66 which is set on when the power supply is restored. Power-up flag 66 is set off after the first transmission following restoration of the power supply.

Memory 38 is also configured for special routines to handle power failures. Memory 38 stores a power-failure delay variable 74, $T_{pwrfail}$, which represents the time that processor 30 waits after sensing an interruption in power supply 34 before sending a power-failure message, as described below. Memory 38 stores a power up-delay constant 75, $T_{pwrup}$, which represents the delay after the restoration of power to meter 20a before processor 30 restarts interval timer 60.

Additionally, memory 38 is configured to count the total number of pulses generated by sensor 32. Memory 38 stores a variable cumulative pulse counter 70, $N_{total}$, which represents the total number of pulses generated by sensor 32. Each time that processor 30 increments counter 44, it also increments cumulative pulse counter 70. Memory 38 also stores a maximum total constant 71, $N_{maxtotal}$, which represents the maximum number of pulses that can be counted by the cumulative pulse counter 70. When cumulative pulse counter 70 exceeds $N_{maxtotal}$, the cumulative pulse counter pulse is reset to zero.

Memory 38 is further configured to count the total number of measurements by meter 20a. Memory 38 stores a sequence number counter 72, $N_{sequence}$, which represents the total number of measurements made by the meter. Sequence number counter 72 is incremented each time a measurement is made.

One constant stored in memory 38 is an identifying code 78, ADDRESS. Each meter in metering system 10 has a unique identifying code ADDRESS which is included in each transmission so that a collector can correctly identify the meter which is sending the transmission. Memory 38 may also store a meter serial number identification (not shown) which is set at the manufacturing plant.

In both the pulse-accumulator meter and the sampling meter, processor 30 is programmed to perform measurement and transmission operations. The programs performed by the sampling meter will be explained after the programs performed by the pulse-accumulator meter.

In a pulse-accumulator meter, processor 30 takes action upon five types of events: receipt of a pulse from sensor 32, expiration of interval timer 60, expiration of alignment timer 62, power failure, and power restoration. The response to each of these events by the pulse-accumulator meter is described below with reference to FIGS. 5A–5E.

As shown in FIG. 5A, when meter 20a powers up, e.g., when power is restored after a power failure, processor 30 delays for a time $T_{pwrup}$, such as twenty microseconds, to ensure that there is a stable power supply (step 80). Following this delay, interval timer 60 is initialized (step 81). Then power-up flag 66 is set on (step 82). Also, in step 82, each bit in power-failure map 64 is left-shifted (thus discarding the leftmost bit), and the rightmost bit, which corresponds to the current interval, is set on. The content of each register 42-0 to 42-17 is shifted to the next register (thus discarding the old measurement stored in register 42-17) (step 83). Also, in step 83, the content of counter 44 is moved to register 42-0, and the counter is set to zero. The sequence number counter 72 is incremented by one (step 84). Then, elapsed interval counter $N_{elapsed}$ is set to a random integer between 0 and $N_{sup}$ (step 85). The processor then awaits the next event.

As shown in FIG. 5B, when processor 30 receives a pulse from sensor 32, it increments counter 44 by one (step 90) and increments cumulative counter 70 (step 91). Then, processor 30 will determine if cumulative counter 70 exceeds the maximum total by comparing $N_{total}$ to $N_{maxtotal}$ (step 92). If $N_{total}$ is greater than $N_{maxtotal}$, the cumulative counter 70 is reset to zero (step 93). The processor then awaits the next event.

As shown in FIG. 5C, when interval timer 60 expires, processor 30 begins by determining whether elapsed interval counter 68, $N_{elapsed}$, equals the transmission frequency $N_{sup}$ (step 100); i.e., processor 30 determines whether enough measurement times have occurred for a transmission. If $N_{elapsed}$ equals $N_{sup}$, then elapsed interval counter 68 is reset (step 101). Thereafter, alignment timer 62 is set to a random value between 0 and $T_{int}$ (step 102). If $N_{elapsed}$ is not equal to $N_{sup}$, then elapsed interval counter 68 is incremented (step 103). In either case, the contents of each register 42-0 to 42-17 are shifted to the next register (thus discarding the old measurement stored in register 42-17), and the content of counter 44 is stored in register 42-0 (step 104). The power failure map 64 is similarly shifted. Then, interval timer 60 is reset (step 105), and sequence number counter 72 is incremented (step 106). The processor then awaits the next event.

With reference to the flowchart in FIG. 5D, when the alignment timer 62 expires, processor 30 causes transmitter 40 to send either an interval-type or a power-up type transmission 24 (step 110). Following the transmission, power-up flag 66 is turned off (if it was on) (step 112).

The meters include a capacitor, or another battery device, to store electrical energy, so that processor 30 may continue operating if power supply 34 fails. As shown in FIG. 5E, if power supply 34 fails, processor 30 waits a random time period $T_{pwrfail}$ (step 140) and then determines whether power supply 34 is restored (step 141). If power supply 34 is not restored, then in step 142 processor 30 causes transmitter 40 to send a power-failure transmission 24'. In the event of a widespread power-outage, waiting for a random time period reduces the likelihood of colliding power-failure transmissions from multiple meters. Waiting for a random time period also allows for faster recovery in the event of a temporary "brown-out". If power is restored, the processor simply waits for the next event.

The contents of an interval-type transmission 24 are shown schematically by FIG. 6. This transmission from transmitter 40 begins with an acquisition pattern 120, which is a string of ninety-two bits which are pseudo-randomly modulated at a chipping rate. The acquisition pattern allows a collector, for example, collector 22a, to detect and synchronize the transmission from a meter. After acquisition pattern 120, the transmitter transmits an address code 122 which was stored in memory 38 as ADDRESS 78. The address code for the meter is set at installation to ensure that each meter in measurement level 12 has a unique identifying code. The address code will be used by a collector to identify which particular meter is transmitting. Following address code 122, there is a message type flag 124. If power-up flag 66 is set, then the transmission will be power-up-type. Otherwise the transmission sent at the expiration of alignment timer 62 is interval-type. The power-up-type and interval-type messages have the same format and the same information; they differ only in message type flag 124. Transmission 24 also includes a field 126 for the cumulative counter $N_{total}$, a field 128 for the sequence number counter $N_{sequence}$, a field 130 for the alignment time $T_{align}$ of the transmission and a field 132 for power failure map 64. Following the power failure map, the transmission includes eighteen fields 134-0 to 134-17 for the contents of the eighteen registers of register set 42. Finally, the transmission includes a cyclic redundancy check (CRC) 136 to ensure that no data has been lost or corrupted in transmission.

The contents of a sample power-failure transmission 24' are shown schematically by FIG. 6. Power-failure transmission 24' starts with an acquisition pattern 120 and an address code 122. However, the message type 124 indicates a power failure. Power failure transmission 24' usually ends with CRC 136.

A sampling meter and a pulse-accumulator meter may operate similarly. Specifically, the processor in a sampling meter takes the same actions in response to a power-up, (see FIG. 5A), a power failure (see FIG. 5E), and the expiration of the alignment timer (see FIG. 5D), as the pulse-accumulator meter.

However, the process performed by the sampling meter differs from the process performed by the pulse-accumulator meter and described above with reference to FIGS. 5B and 5C in several respects. First, the processor does not take action in response to a pulse from sensor 32. Second, the processor takes additional actions in response to the expiration of the interval timer (see FIG. 5C). After the expiration of a measurement interval, e.g., in the equivalent of step 104, the sampling meter processor loads a measurement from the sensor into counter 44. The sampling meter processor may also add the measurement to cumulative counter 70.

By following the process discussed above, meter 20a, whether configured as a sampling meter or a pulse-accumulator meter, takes a series of measurements. Referring to FIG. 7, the series of measurements 150 are shown as a graph of the measured parameter as a function of time. An individual measurement 152 represents the value of the parameter during a discrete time interval 154.

In a pulse accumulator configuration, measurement 152 represents the number of pulses generated during discrete time interval 154. For example, if meter disk 48 rotates fifty-three times during discrete time interval 154, then measurement 152 represents fifty-three pulses. In a sampling meter, each measurement indicates the value of the parameter at the beginning of discrete time interval 154. For example, if a temperature meter measures the ambient temperature as 23.2° C. at the beginning of time interval 154, then measurement 152 represents 23.2° C.

In normal operation, the content of counter 44 is moved to register 42-0 each time interval timer 60 expires (see step 104 of FIG. 5C). Therefore, discrete time interval 154 should have a duration of $T_{int}$, such as 2.5 minutes. However, if a power failure occurs, then the content of counter 44 is moved to register 42-0 as soon as power is restored (see step 83 of FIG. 5A). Therefore, the duration of discrete time interval 154 may be longer or shorter than $T_{int}$, depending upon the duration of the power failure.

As described above, meter 20a transmits the contents of register set 42 to collector 22a. A transmission time occurs after a number of measurement times equal to the transmission frequency $N_{sup}$. Preferably, $N_{sup}$ is between one and ten. In one configuration, $N_{sup}$ is two. However, the transmission does not occur simultaneously with a measurement time. Instead, once the elapsed interval counter $N_{elapsed}$ equals the transmission frequency $N_{sup}$, processor 30 triggers the alignment timer (see step 102 of FIG. 5C). The transmission occurs only after the expiration of the alignment time $T_{align}$ as determined by the alignment timer (see step 110 of FIG. 5D). Thus, alignment timer 62 offsets the transmission time from a measurement time by a random amount, $T_{align}$. A random transmission time for each meter reduces the probability of collisions between transmissions from meters 20a–20k.

Five transmissions out of a series of ten transmissions 24a–24j are shown in FIG. 7. If there are eighteen registers and there is a transmission every two intervals, then each measurement in series 150 is transmitted nine times. For example, a measurement 156 for a time interval 158 is initially stored in register 42-0 and sent in field 134-0 of transmission 24a. In the next transmission 24b, measurement 156 has been shifted to register 42-2 and is placed in field 134-2. Two intervals after that, measurement 156 has been shifted to register 42-4 for transmission 24c. After six more transmissions, measurement 156 is stored in register 42-16 and placed in field 134-16 in transmission 24i. Two intervals later, measurement 156 is flushed from the registers, and subsequent transmission 24j does not contain the measurement for interval 158.

As described in detail below, a collector is able to extract measurement series 150 from a sequence of transmissions 24 from a meter. Specifically, the collector can differentiate the new measurements in transmission 24 from those measurements transmitted in previous transmissions, and to detect missing or unreliable measurements. In addition, the collector is able to analyze a measurement series to generate a metered function of the parameter.

As shown in FIG. 8, a collector, such as collector 22a, includes a receiver 160, a central processing unit (CPU) 162, a clock 164, a memory 166, and a transceiver 168. Receiver 160 picks up transmissions 24 from meters 20a–20d (see FIG. 1) and delivers them to CPU or processor 162, which then stores each transmission 24 in memory 166. Transceiver 168 sends transmissions 28 containing the metered function for each meter 20a–20d to monitoring station 26. Transceiver 168 may also receive transmissions 28 from monitoring station 26 to configure the collector and determine which metered functions the collector will calculate for each meter 20a–20d.

Memory 166 may be constructed of volatile or non-volatile memory devices. As shown in FIG. 9, memory 166 includes an agent program 170 to control processor 162. Memory 166 also includes a set of meter objects 172a–172d. Each meter object is a data structure that represents one meter, e.g., meter object 172a may represent meter 20a, meter object 172b may represent meter 20b, and so on. Meter object 172a includes configuration parameters for the particular meter it represents: the address of the meter (ADDRESS), the interval time, $T_{int}$, used by the meter, the number of measurement times per transmission, $N_{sup}$, and the maximum total, $N_{maxtotal}$, of the cumulative counter.

The meter object 172a may also include a maximum count rate $N_{maxrate}$, which represents the maximum rate of change of the parameter. As an example, disk 48 of the electromechanical meter cannot turn faster than one-hundred and twenty revolutions per minute. Therefore, if a comparison between two measurements indicates that $N_{maxrate}$ has been exceeded, processor 30 will issue an error. Meter object 172a may also include a scaling factor which converts the value in a register into physical parameter. For example, each rotation of disk 48 of a electromechanical meter represents 7.2 Watt-Hours of electrical energy. Therefore, if measurement 156 is sixty, 432.0 Watt-Hours of electricity were consumed in discrete time interval 158 (see FIG. 7).

Meter objects 172b–172d have the same format as meter object 172a, but may have different values for the configuration parameters. For example, meter object 172a may have $T_{int}$ set to 2.5 minutes whereas meter object 172b has $T_{int}$ set to 3.5 minutes.

The relationship between the measurement time, the interval time $T_{int}$, the receipt time of a transmission, the alignment time of a transmission, and the sequence number, is illustrated by FIG. 10. FIG. 10 shows a previous transmission 24y and a more recent transmission 24z. Specifically, for each transmission, the difference between the measurement time at the meter and the receipt time at the collector is equal to alignment time $T_{align}$ of the transmission.

With reference to FIG. 9, meter object 172a may also include the following information about the previous and most recent transmissions from meter 20a: the cumulative totals (OldTotal and NewTotal), the times of receipt (OldTime and NewTime), the alignment times (OldT$_{align}$ and NewT$_{align}$), the sequence numbers (OldSequence# and NewSequence#), and the power failure maps (see FIG. 6). This information is used, as described below, to analyze the new transmission from meter 20a and extract the previously unprocessed measurements.

Returning to FIG. 10, after each transmission, collector 22a will process the "new" measurements, i.e., the measurements in the most recent transmission 24z which were not included in the previous transmission 24y. Collector 22a may ignore the "old" measurements, i.e., the measurements in the most recent transmission 24z which were included in the previous transmission 24y. Because sequence number counter 72 is incremented with each measurement, the number of new measurements in transmission 24z is equal to the difference between the new value (NewSequence#) and old value (OldSequence#) in sequence number field 128. If no transmissions are missed, the difference between the old and new sequence numbers will equal the transmission frequency $N_{sup}$. For example, if $N_{sup}$ equals two, and no transmissions are missed, then only the two most recent measurements (from registers 42-0 and 42-1 in FIG. 5) will be new. However, if several transmissions are missed, then the difference between the sequence numbers may be greater than two. For example, as shown in FIG. 10, if OldSequence# is twenty-four and NewSequence# is thirty-two, then NewSequence# minus OldSequence# equals eight, and therefore measurements #0–7 are new.

The time period spanned by the new measurements must be accurately determined in order to generate the metered functions. Referring to FIG. 10, it is possible to accurately determine the time $T_1$ at beginning of the new measurements, i.e., the time at the beginning measurement #7. It is also possible to determine the time $T_2$ at the end of new measurements, i.e., the time at the end of measurement #0.

As discussed above, the measurement time of the last measurement in any transmission is equal to the transmission's alignment time subtracted from its receipt time at the collector. Thus, the time $T_2$ of the end of the measurement #0 in transmission 24z can be calculated by subtracting the receipt time of transmission 24z (NewTime) from its alignment time (NewT$_{align}$). The time $T_1$ of the beginning of the new measurements in transmission 24z corresponds to the measurement time of the last measurement in transmission 24y. Therefore, the time $T_1$ at the beginning of measurement #7 can be calculated by subtracting the alignment time of transmission 24y (OldT$_{align}$) from its receipt time (OldTime). As will be described below, the metered functions are calculated from the times $T_1$ and $T_2$ at the beginning and end of the new measurements.

There are two basic sources of error in metering system 10: missed meter transmissions and power failures. Due to interference and the possibility of collisions between meter transmissions, there is a some likelihood that a transmission from a meter will not be received by its associated collector. As described above, and as shown in FIG. 7, measurement 156 in a discrete time interval 158 is repeated in nine transmissions 24a–24i in a row. Therefore, a measurement will be lost only if all nine successive transmissions 24a–24i fail.

Power failures pose a more complicated problem; the measurement is not lost, but because the duration of the power failure is unknown, the time at which the measurement was made is uncertain. Because counter 44 is kept in non-volatile memory, the content of counter 44 is not lost when power supply 34 fails. Therefore, the data accumulated prior to the power failure, e.g., the number of revolutions of electromechanical disk 48, is transmitted at the next transmission.

Each discrete time interval ends with a measurement time, which can be triggered either by the expiration of the interval timer 60 (see step 104 of FIG. 5C), or by restoration of power after a power failure (see step 83 of FIG. 5A). Returning to FIG. 7, if a power failure occurs during discrete time interval 158, the discrete time interval has an indeterminate duration. Normal intervals, i.e., discrete time intervals in which no power failure occurs, end when interval timer 60 expires, and have a standard duration of $T_{int}$. On the other hand, power failure intervals, i.e., discrete time intervals in which a power failure occurred, end when power is restored. Because the power failure may last a few seconds or several hours, the duration of the power failure interval depends upon the duration of the power failure.

In the event of either missing intervals (due to nine successive failed transmissions) or power failures, collector 22a will perform a recovery operation to generate the metered functions. The exact nature of the recovery operation will depend upon the type of metered function generated by collector 22a, and will be described below. However, the recovery operation captures any missing measurements and measurements for which the measurement times are uncertain during a recovery period 230 (see FIG. 11).

Agent program 170 performs a "walking" program 175 to find and process the new measurements, to determine whether there are any missing measurements or power failure intervals, and to determine the recovery period 230. The walking program must be able to recognize five hypothetical cases shown in FIG. 11. In Case#1, although the collector may have missed several transmissions, there are no missing measurements or power failures, and no recovery operation is required. In Case#2, there is one power failure "F" in the new measurements in transmission 24z. Recovery period 230 spans only the single power failure interval 235. In Case#3 there are two or more power failures "F" in transmission 24z, and the recovery period covers the time between the earliest and latest power-failure intervals 236 and 237. The "?"s between power failure intervals 236 and 237 indicate that the collector does not determine whether those intervals are normal intervals or power failure intervals; i.e., the collector does not examine the power failure map to determine whether a power failure is associated with the measurement. In Case#4 there are no power failures, but nine or more transmissions were missed, so there are missing measurements (shown by the gap between the previous transmission 24y and the new transmission 24z). In this case, the recovery operation is performed for the recovery period between transmissions 24y and 24z. Finally, in Case#5, there is at least one power failure "F" in the new measurements and there are missing measurements. Recovery period 230 covers the time from the previous transmission 24y to the most recent power failure interval 238.

Walking program 175 uses two indexes, IndexRight and IndexLeft, to determine the boundaries of recovery period 230. IndexRight and IndexLeft start by pointing to the earliest and latest new measurements. For example (as shown by FIG. 10), IndexRight points to measurement #0 and IndexLeft points to measurement #7. First, walking program 175 steps IndexLeft forward, i.e., decrements it by one, one measurement at a time, processing each measurement to generate the metered functions, until a power failure or IndexRight is encountered. Then IndexRight is moved backward, i.e., increments it by one, one measurement at a time, until a power failure or IndexLeft is encountered. If IndexRight encounters a power failure interval or a missing measurement, then walking program 175 defines recovery period 230 as the time between the measurements pointed to by IndexLeft and IndexRight. Once walking program 175 has defined recovery period 230, it performs a recovery operation. Finally, the collector processes the remainder of the measurements by stepping IndexRight forward until the most recent measurement is reached.

Walking program 175 also uses several variables to perform the recovery operation. The variables include TimeLeft, TimeRight, TotalLeft and TotalRight. When walking program 175 is complete, TimeLeft and TimeRight will be the times at the beginning and end, respectively, of recovery period 230. Similarly, when walking program 175 is complete, TotalLeft and TotalRight will equal the cumulative total $N_{total}$ at the beginning and end of recovery period 230.

Referring to FIG. 12, walking program 175 begins by setting several variables (step 180). IndexRight is set equal to zero to point to the last new measurement. The walking program accesses meter object 172*a* to set variable TimeLeft equal to the time $T_1$ at the beginning of the first new measurement. TimeLeft equals the receipt time (OldTime) minus the alignment time ($OldT_{align}$) of transmission 24*y* (see FIG. 10). Walking program 175 also access meter object 172*a* to set the variable TotalLeft equal to the cumulative total OldTotal from transmission 24*y*. The variable TimeRight is set equal to the receipt time (NewTime) of transmission 24*z* minus the value ($NewT_{align}$) of alignment field 130 (see FIG. 10). Thus, the variable TimeRight equals the time $T_2$ when the content of counter 44 was placed into register 42-0. The variable TotalRight is set equal to cumulative total field 126. The variables OldSequence# and NewSequence# are taken from meter object 172*a* and sequence field 128 in transmission 24, respectively.

The walking program next determines whether there are any missing measurements by comparing the sequence number (NewSequence#) of the most recent transmission 24*z* and the sequence number (OldSequence#) of the previous transmission 24*y* (step 181). If NewSequence# is greater than OldSequence# plus the number of registers in register set 42, e.g., eighteen, then at least one measurement has been missed. If this is the case, then the walking program moves immediately to step 189, as described below.

If NewSequence# is less than OldSequence# plus eighteen, then the walking program begins a forward walk of IndexLeft. First, IndexLeft is set equal to NewSequence# minus OldSequence# minus one (step 182). Then, the walking program determines whether there was a power failure interval at IndexLeft by examining the power failure map from the most recent transmission (step 183). If the measurement is not associated with a power failure interval, then the walking program determines whether the IndexLeft and IndexRight now point to the same measurement (step 184). If IndexLeft is not equal to IndexRight, then agent program 170 processes measurement IndexLeft (step 185). The processing step will be described in greater detail below, but it calculates metered functions, such as a load profile, a time-of-use profile, or a demand profile. After agent program 170 has processed the measurement, IndexLeft is decremented by one (step 186). Then TimeLeft will be increased by the interval time $T_{int}$, and TotalLeft will be increased by the value in field 134 to which IndexLeft points (step 187). Then the walking program loops back to step 183.

With each run through the loop of steps 183–187, IndexLeft is decremented. Eventually, either IndexLeft will reach IndexRight or there will be a power failure interval. If IndexLeft is less than IndexRight, as determined in step 184, then walking program 175 has successfully completed processing transmission 24 and ends the walking program (step 188). If there is a power failure, then walking program 175 begins a backward walk of IndexRight.

If, as determined by step 181, NewSequence# is greater than OldSequence# plus eighteen, then IndexLeft is set equal to eighteen (step 189). Following step 189, or if a power failure is detected in step 183, the walking program compares IndexRight to IndexLeft (step 190). If IndexRight is not equal to IndexLeft, then the walking program determines whether there is a power failure in interval IndexRight (step 191). If IndexRight equals IndexLeft, or if a power failure is detected in step 191, then the walking program ends and the agent program runs a recovery operation (step 192). The recovery operation will be described below, but, in brief, it uses the cumulative totals TotalRight and TotalLeft to estimate the missing measurements.

If no power failure is detected in step 191, then IndexRight is incremented by one (step 194). Next, TimeRight is decreased by the interval time $T_{int}$, and TotalRight is decreased by the value of field 134 for measurement IndexRight (step 195). Then walking program 175 loops back to step 190. Eventually, either IndexRight will equal IndexLeft, or a power failure interval will be detected, and a recovery operation will be performed (step 192).

After the recovery operation, agent program 170 processes the remaining measurements. First, walking program 175 determines whether IndexRight has reached the most recent measurement (step 196). If IndexRight is less than zero, then the processing is complete, and walking program ends. Otherwise, IndexRight is decremented (step 197), and the measurement to which IndexRight points is processed (step 198). After step 198, the walking program loops back to step 196.

In processing steps 185 and 198, and in recovery operation 192, the collector converts the raw data from the meters into useful information by generating the metered functions. Many metered functions are possible. For example, the metered function may provide the average, maximum, or minimum value of the parameter in predetermined time intervals. The metered function may describe the relative distribution of the parameter in certain times of the day. In one embodiment described below for an electrical utility company, a collector can generate a load profile, a time-of-use profile and a demand profile.

A load profile is a chart of the rate of use of the parameter in set time increments. For example, the electrical utility company might wish to know the rate of use electricity in a household for each hour during a day, i.e., one a.m to two a.m., two a.m. to three a.m., etc. Of course, the time increments may be shorter, such as fifteen or thirty minutes, or longer, such as two or four hours.

A time-of-use profile is a chart of the distribution of consumption over certain periods of the day. A time-of-use profile allows the utility company to set different rates for different times of the day. For example, an electrical utility company might wish to know the total amount of electricity consumed between seven a.m. and ten a.m. during the previous month. The utility company could then apply a different rate to the electricity consumed between seven a.m. and ten a.m.

A demand profile determines the quantity and time of the peak electricity consumption. For example, the electrical utility company might wish to know the maximum amount of electricity consumed in any fifteen minute demand period during the previous month, and the time of that maximum. There are two types of demand functions: block demand and rolling demand. Block demand looks at each segment of time independently, whereas rolling demand has overlapping segments.

In processing steps 185 and 198 and in recovery step 192, agent program 170 begins by determining which metered functions the collector will calculate for the meter. As described below, each of the profiles, i.e., load profile, time-of-use profile and demand profile, may have a different calculation (in steps 185 or 198) and a different recovery operation (in step 192).

As shown in FIG. 13, each collector can provide a load profile graph showing the consumption of electricity (in kilowatts per hour) for each hour in the day at a particular meter to the monitoring station. The collectors generate the load profiles by analyzing the measurements from the meters.

Meter object 172a may contain a load profile interval field $N_{LPI}$. The load profile interval field stores the number of time intervals $T_{int}$ in a load profile time period. For example, if the time interval $T_{int}$ is 2.5 minutes, then $N_{LPI}$ would be set equal to twenty-four to provide a load profile period of one hour (24*2.5 minutes). The load profile periods are synchronized to cardinal points of clock 164. For example, if the load profile period is thirty minutes, then the load profile periods will start on the hour and half-hour. If $N_{LPI}$ is set to zero, then collector 22a will not generate a load profile. In addition, meter object 172a may be associated with one or more objects 201 in memory 166 (see FIG. 9) which store the load profile chart.

For each normal interval processed (steps 185 or 198 of FIG. 12), agent program 170 determines the center of the normal interval. For normal intervals processed from step 185, the interval center is TimeLeft+1/2*$T_{int}$, whereas for normal intervals processed from step 198, the interval center is TimeRight−1/2*$T_{int}$. Then the agent program determines which load profile period is in effect at the interval center, and adds the measurement to that period.

For example, if $T_{int}$ is 2.5 minutes and $N_{LPI}$ is 12, then each load profile period is half-an-hour. If a normal interval has TimeLeft equal to 11:29:00 A.M., the center of the interval will be located at 11:30:15 A.M., and therefore the measurement for that normal interval will be added to the 11:30 A.M. to 12:00 P.M. load profile period.

If there are any power failures or missing measurements, then collector 22a performs a recovery operation (step 192 of FIG. 12). In a recovery operation, collector 22a first calculates the difference $N_{diff}$ between TotalRight and TotalLeft. Then collector 22a determines whether the recovery period 230 (see FIG. 11) between TimeLeft and TimeRight fits within a single load profile period. If so, then $N_{diff}$ is added to the appropriate load profile period. If not, then $N_{diff}$ is added to a quality metric stored in the meter object, as discussed below.

Each collector analyze the measurements from its associated meters to generate a time-of-use profile showing the total consumption of electricity (in kilowatts hours) at a particular meter for specific time periods.

Meter object 172a may contain a time-of-use schedule identification (TOU_ID) field and several "bins", i.e., registers. Memory 166 of collector 22a may contain multiple schedules 200a–200c which can link certain time periods with certain bins (see FIG. 9). The TOU_ID field identifies which schedule is in effect for the meter.

Referring to FIGS. 14A and 14B, a schedule 200a links time periods listed in column 202 to bins listed in column 204. For example, if measurement 156 occurred on a weekend, it would be added to a first bin 206. Measurements at the peak hours of 7 A.M. to 10 A.M. and 5 P.M. to 8 P.M. would be added to a second bin 207, and measurements at other times would be added to a third bin 208. This would permit the electrical utility company to calculate the total energy consumed during the peak consumption hours in order to bill at a higher rate. Schedule 200a may be considerably more complicated, and may include references to calendars with holidays or other special days.

Time-of-use profiles are calculated in much the same way as the load profile. For each normal interval, agent program 170 determines the center of the normal interval. Then, based on schedule 200, the agent program determines which bin is in effect at the center of the normal interval, and adds the measurement to the that bin.

In a recovery operation, collector 22a first calculates $N_{diff}$, the difference between TotalRight and TotalLeft. Then collector 22a determines if recovery period 230 crosses midnight. If recovery period 230 does not cross midnight, collector 22a determines if the recovery period fits within a single time-of-use period. If so, then $N_{diff}$ is added to the appropriate bin. Otherwise, the distribution of $N_{diff}$ between the two bins is estimated. A simple estimation is to distribute $N_{diff}$ in proportion with to the overlap of recovery period 230 with the time-of-use periods. For example, if the switch point between BIN 1 and BIN 2 occurs at a switching time SwitchTime, then the collector would add $N_{diff}$*[SwitchTime−TimeLeft]/[TimeRight−TimeLeft] to BIN 1 and add $N_{diff}$*[TimeRight−SwitchTime]/[TimeRight−TimeLeft] to BIN 2.

There may be an exception to this estimation in the case of a single power failure interval as shown in Case#2 in FIG. 11. In that case, if the start of the power failure interval TimeRight is more than $T_{int}$ before the start of the second time-of-use period, then $N_{diff}$ is added to the first time-of-use period.

Each collector can analyze the measurements from its associated meters to generate a demand profile showing the time and amount of highest consumption of electricity (in kilowatts hours) at a particular meter.

Meter object 172a may contain a demand segment field $N_{DS}$ and a demand period field $N_{DP}$. The demand segment field $N_{DS}$ stores the number of time intervals $T_{int}$ in a demand segment. The demand period field $N_{DP}$ stores the number of demand segments in a demand period. If $N_{DS}$ is zero then collector 22a will not generate a demand profile.

Referring to FIGS. 15A, assuming that the interval time $T_{int}$ is 2.5 minutes, collector 22a generates block demand periods 210 of twenty minutes by setting $N_{DS}$ to eight (8*2.5=20 minutes per demand segment) and setting $N_{DP}$ to one (1*20=20 minutes per demand period).

Referring to FIG. 15B, collector 22a generates rolling demand periods 220 of thirty minutes which overlap by twenty minutes by setting $N_{DS}$ to four (4*2.5=10 minutes per demand segment) and $N_{DP}$ to three (3*10=30 minutes per demand period).

Demand profiles are calculated by using a buffer to hold the data for the demand segments, and the total of the buffer is recalculated each new demand period. Each demand calculation is compared to a demand peak that is stored in the meter object. If the new demand calculation is greater than the stored demand peak, the new calculation is stored to the meter object along with the ending time of the demand period. One demand peak may be stored for each time-of-use bin.

In a recovery operation for a demand profile, collector 22a resets the demand calculation by clearing the buffer and starting a new demand segment. For example, as shown in FIGS. 15A and 15B, the vertical dashed line 225 represents a power failure {or a missing measurement}. In addition, the collector may wait for a grace period before starting a new demand segment. The grace period lasts until a grace number $N_{grace}$ of measurement times have passed. The grace period prevents a customer from being penalized for the power surge that usually occurs following the restoration of power.

A meter object may also include a quality metric, i.e., a measurement of the performance of meter system 10. The quality metric may include the total number of power failures at the meter and a missing data field showing the total electrical consumption that was not used in the metered functions.

In summary, the metering system of the present invention provides a measuring level with multiple meters and a collection level with multiple collectors. Each meter periodically measures a parameter, such as electricity consumption, and stores the sequence of measurements. Each meter periodically transmits the contents its registers to a collector by a wireless signal. When a collector receives a transmission, it determines which meter sent the transmission, and then extracts the new, i.e., previously unprocessed, measurements. The collector then uses the measurements to generate a metered function, such as a load profile, a time-of-use profile, or a demand profile. The collector can compensate for missed transmissions and power failures. The metered functions for each meter are transmitted from each collector to a monitoring station. The operator of the metering system determines how the metered functions are used by the monitoring station, e.g., an electrical utility company may have the monitoring station generate a customer billing using the metered function.

The present invention has been described in terms of a preferred embodiment. The invention, however, is not limited to the embodiment depicted and described. Rather, the scope of the invention is defined by the appended claims.

What is claimed is:

1. A data collection system comprising:
   a) a plurality of telemetry devices, each including
      i) a sensor configured to generate a series of successive measurements by measuring a parameter at a series of measurement times,
      ii) a memory configured to store a plurality of measurements from said series of successive measurements, and
      iii) a transmitter configured to transmit measurements stored in memory to a collection device at a series of transmission times, each of said transmitted measurements being transmitted at a plurality of different transmission times; and
   b) a collection device having
      i) a receiver configured to receive transmissions from said telemetry devices,
      ii) a processor configured to extract said series of successive measurements from a series of received transmissions and further configured to generate a metered function of said parameter by analyzing said series of successive measurements, and
      iii) a transmitter configured to transmit said metered function to a monitoring station.

2. The data collection system of claim 1 wherein the transmitter of each telemetry device is configured to generate wireless transmissions.

3. The data collection system of claim 1 wherein the sensor of each telemetry device includes:
   a counter for storing a value,
   means for incrementing said counter upon receipt of a trigger signal, and
   means for storing said value from said counter in said first memory and resetting said counter at said measurement times.

4. The data collection system of claim 1 wherein each of said telemetry devices discards the oldest measurement stored in memory and stores in memory a new measurement from said sensor.

5. The data collection system of claim 1 wherein the memory of each telemetry device is configured to store eighteen measurements.

6. The data collection system of claim 1 wherein each of said telemetry devices further includes a timer having a predetermined time interval, wherein the expiration of said predetermined time interval causes said sensor to generate a measurement.

7. The data collection system of claim 6 wherein said predetermined time interval is approximately 2.5 minutes.

8. The data collection system of claim 6 wherein restoration of power following a power failure causes the sensor of each telemetry device to generate a measurement.

9. The data collection system of claim 1 wherein
   said collection device further includes a memory configured to store a data object representing a given telemetry device from which the collection device receives transmissions.

10. The data collection system of claim 9 wherein
    said collection device further includes a clock configured to determine a receipt time of a current transmission received from the given telemetry device,
    the data object representing the given telemetry device includes a receipt time of a previous transmission from the given telemetry device, and
    the processor of the collection device is configured to compare the receipt time of the current transmission received from the given telemetry device to the receipt time of the previous transmission received from the given telemetry device.

11. The data collection system of claim 9 wherein
    the memory of each telemetry device is configured to store a number,
    the given telemetry device increments said number each time a measurement is generated,
    said stored number is transmitted by the transmitter of the given telemetry device in a current transmission,
    the data object representing the given telemetry device includes a number transmitted in a previous transmission received from the given telemetry device; and
    the processor of the collection device is configured to compare the number transmitted in the current transmission to the number transmitted in the previous transmission.

12. The data collection system of claim 9 wherein
    each of said telemetry devices includes means for detecting a power failure,
    the memory of each telemetry device is configured to store power failure information indicating whether each stored measurement was generated following a power failure, said power failure information is transmitted by the transmitter of the given telemetry device at said transmission times, and the data object representing the given telemetry device includes said transmitted power failure information received by the collection device from the given telemetry device.

13. The data collection system of claim 9 wherein said metered function is a load profile, and the data object includes the duration of a load profile period.

14. The data collection system of claim 9 wherein said metered function is a time-of-use profile, the data object includes a plurality of time-of-use measurements, and the memory of the collection device is configured with a calendar to link a measurement time of a measurement to one of said time-of-use measurements.

15. The data collection system of claim 9 wherein said metered function is a demand profile, and the data object includes a duration of a demand profile period.

16. The data collection system of claim 1 wherein said parameter is selected from the group consisting of electrical power, fluid flow, voltage, current, temperature, pressure, and humidity.

17. The data collection system of claim 16 wherein said parameter is electrical power.

18. The data collection system of claim 16 wherein said parameter is fluid flow.

19. The data collection system of claim 18 wherein said fluid is natural gas.

20. The data collection system of claim 18 wherein said fluid is water.

21. A method of collecting data comprising the steps of:

a) generating a series of successive measurements by measuring a parameter with a telemetry device at a series of measurement times;

b) storing a plurality of said measurements in said telemetry device;

c) transmitting said stored measurements to a collection device at a series of transmission times;

d) extracting said series of successive measurements from a series of said transmissions with said collection device;

e) generating a metered function of said parameter with said collection device by analyzing said series of successive measurements; and f) transmitting said metered function to a monitoring station.

22. The method of claim 21 further comprising the steps of:

storing an old number in said collection device, generating a new number in said telemetry device each time a measurement is generated, transmitting said new number with stored measurements, and comparing said old number to said new number at said collection device to determine which measurements are new measurements which were not previously received by said collection device and whether there are missing measurements.

23. The method of claim 21 wherein said transmissions are wireless transmissions.

24. The method of claim 22 further comprising the step of storing said old number in said telemetry device, and wherein the step of generating said new number includes incrementing said old number.

25. The method of claim 24 further comprising the step of determining the measurement times for new measurements received by said collection device.

26. The method of claim 25 further comprising the steps of:

storing information in said telemetry device indicating whether a power failure occurred between successive measurements, transmitting said information to said collection device, and using said information to determine whether there are new measurements for which the measurement time cannot be determined.

27. The method of claim 26 further comprising the step of performing a recovery operation for missing measurements or new measurements for which the measurement time cannot be determined.

28. The method of claim 21 further comprising the step of waiting an alignment time following a measurement to transmit said stored measurements.

29. The method of claim 28 wherein said alignment time is selected randomly.

30. The method of claim 28 wherein said transmission occurs following an integer number of measurements.

31. The method of claim 28 further comprising the steps of:

transmitting said alignment time from said telemetry device to said collector in a transmission, determining a receipt time representing the time said collector receives said transmission, and subtracting said alignment time from said receipt time to generate a time representing the measurement time of the most recent measurement in the transmission.

32. The method of claim 21 wherein said parameter is selected from the group consisting of electrical power, fluid flow, voltage, current, temperature, pressure, and humidity.

33. The method of claim 32 wherein said parameter is electrical power.

34. The method of claim 32 wherein said parameter is fluid flow.

35. The method of claim 34 wherein said fluid is natural gas.

36. The method of claim 34 wherein said fluid is water.

37. A network for collecting data generated by a plurality of sensors, comprising:

a) a plurality of data generating devices, each including i) a sensor configured to generate measurements by measuring a parameter, ii) a memory configured to store said measurements, and iii) a transmitter configured to transmit at a plurality of transmission times measurements stored in memory to an intermediate device; and b) a plurality of intermediate devices, there being fewer intermediate devices than data generating devices, each of said intermediate devices including i) a receiver configured to receive transmissions from a subset of said plurality of data generating devices, ii) a processor configured to extract said measurements from said transmissions and further configured to generate a metered function of said parameter by analyzing said measurements, and iii) a transmitter to transmit said metered function; and c) a central station configured to receive said transmitted metered functions from said plurality of intermediate devices.

38. A method of collecting data comprising the steps of:

a) generating measurements by measuring a parameter with a sensor;

b) storing a plurality of said measurements in a memory;

c) transmitting said stored measurements to an intermediate device;

d) extracting said measurements from said transmissions with said intermediate device;

e) generating a metered function of said parameter with said intermediate device by analyzing said measurements; and f) transmitting said metered function to a central station.

39. A data collection system, comprising:

a plurality of sensors each of which has a meter configured to sample a parameter value at discrete measurement times and a transmitter configured to transmit data measured by the meter; and a collector having a receiver configured to receive data transmitted by the plurality of sensors, a processor configured to generate a summary profile of data received by the receiver from the plurality of sensors, and a transmitter configured to transmit the summary profile to a monitoring station, wherein each sensor periodically transmits a plurality of data measurements during a current data collection period and, with each transmission, each sensor transmits redundant data measurements corresponding to a prior transmission, and the collector is configured to reduce the occurrence of usage profile errors based upon the redundant data measurements contained in a received transmission.

* * * * *